United States Patent
Sakai

(10) Patent No.: US 7,753,601 B2
(45) Date of Patent: Jul. 13, 2010

(54) MECHANICAL SHUTTER CONTROL METHOD AND IMAGE SENSING APPARATUS

(75) Inventor: Masanori Sakai, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 242 days.

(21) Appl. No.: 11/948,123

(22) Filed: Nov. 30, 2007

(65) Prior Publication Data

US 2008/0152335 A1 Jun. 26, 2008

(30) Foreign Application Priority Data

Dec. 21, 2006 (JP) ............................. 2006-344669

(51) Int. Cl.
G03B 9/32 (2006.01)
(52) U.S. Cl. ...................................... 396/480; 396/479
(58) Field of Classification Search ................. 396/479, 396/480
See application file for complete search history.

(56) References Cited

U.S. PATENT DOCUMENTS

| | | | | |
|---|---|---|---|---|
| 3,913,112 | A * | 10/1975 | Takahama | 396/358 |
| 5,153,783 | A * | 10/1992 | Tamada et al. | 386/117 |
| 6,370,339 | B1 * | 4/2002 | Stern et al. | 396/429 |
| 6,493,757 | B1 * | 12/2002 | Sakai et al. | 709/226 |
| 6,510,282 | B1 * | 1/2003 | Ruck et al. | 396/8 |
| 7,099,555 | B2 * | 8/2006 | Onuki et al. | 385/147 |
| 2009/0213233 | A1 * | 8/2009 | Kido | 348/208.4 |

FOREIGN PATENT DOCUMENTS

| | | |
|---|---|---|
| JP | U06-026895 | 7/1994 |
| JP | 11-041523 | 2/1999 |
| JP | 2001-023220 | 1/2001 |
| JP | 2001-215555 | 8/2001 |
| JP | 2005-283897 | 10/2005 |

* cited by examiner

*Primary Examiner*—W. B. Perkey
*Assistant Examiner*—Warren K Fenwick
(74) *Attorney, Agent, or Firm*—Cowan, Liebowitz & Latman, P.C.

(57) ABSTRACT

A control method for a mechanical shutter in an image sensing apparatus that has the mechanical shutter which includes and a second curtain held in a pre-travel initial position using electric power, that performs image sensing using an image sensor, and that has an electronic viewfinder function. The voltage of the electric power for holding the second curtain is reduced during execution of the electronic viewfinder function, the voltage of the electric power for holding the second curtain is raised if a shutter speed set for image sensing is faster than a preset period in a case where still image sensing is instructed, and the second curtain is made to travel when a period corresponding to the shutter speed has elapsed.

11 Claims, 15 Drawing Sheets

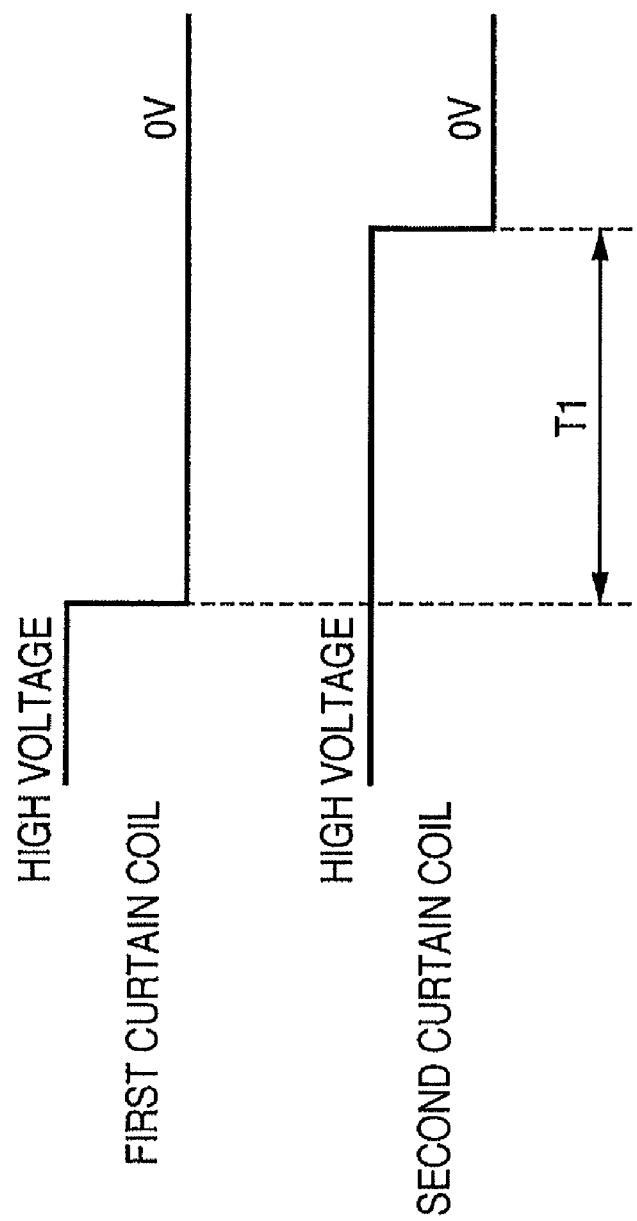

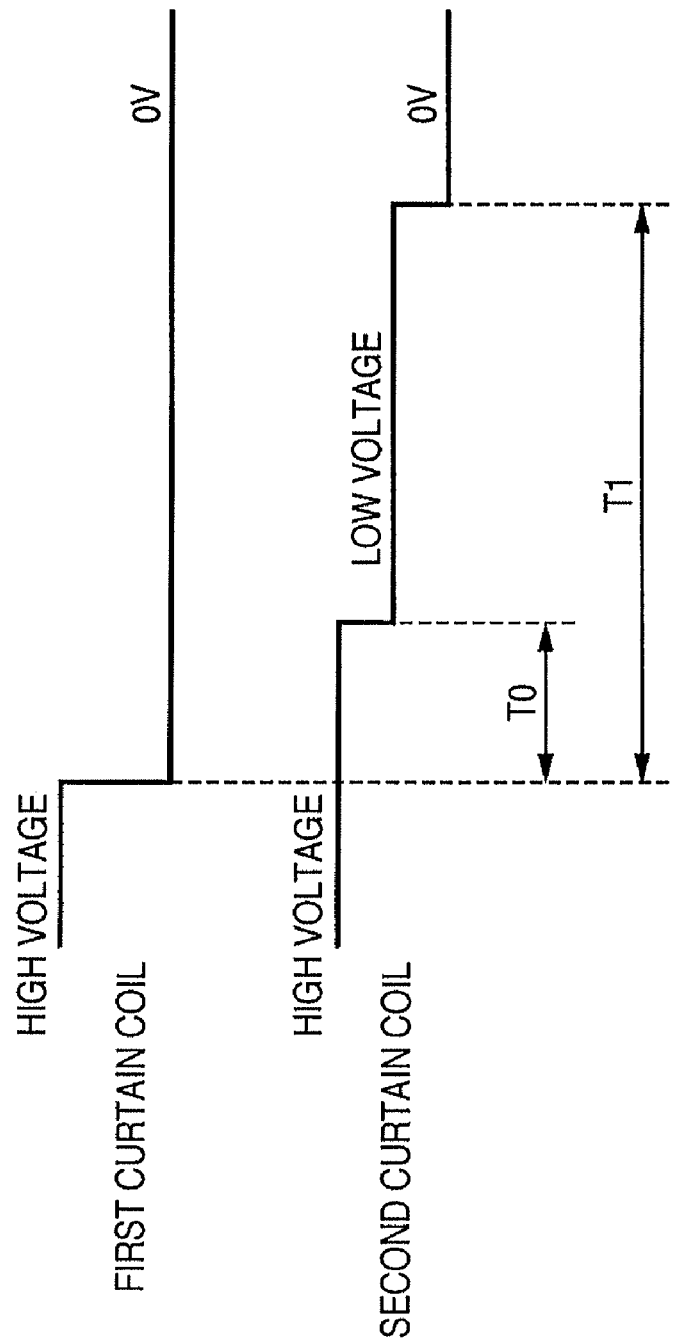

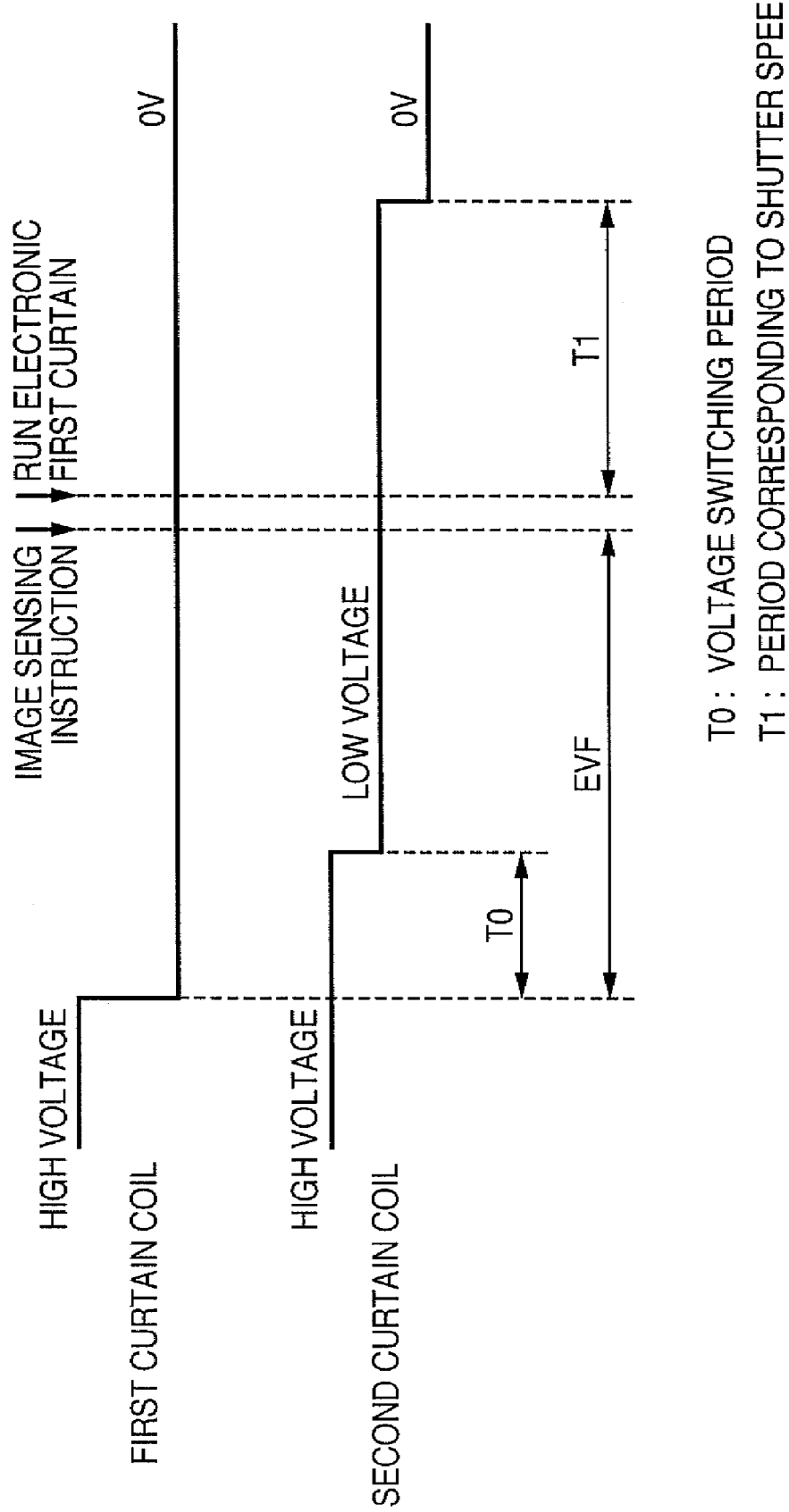

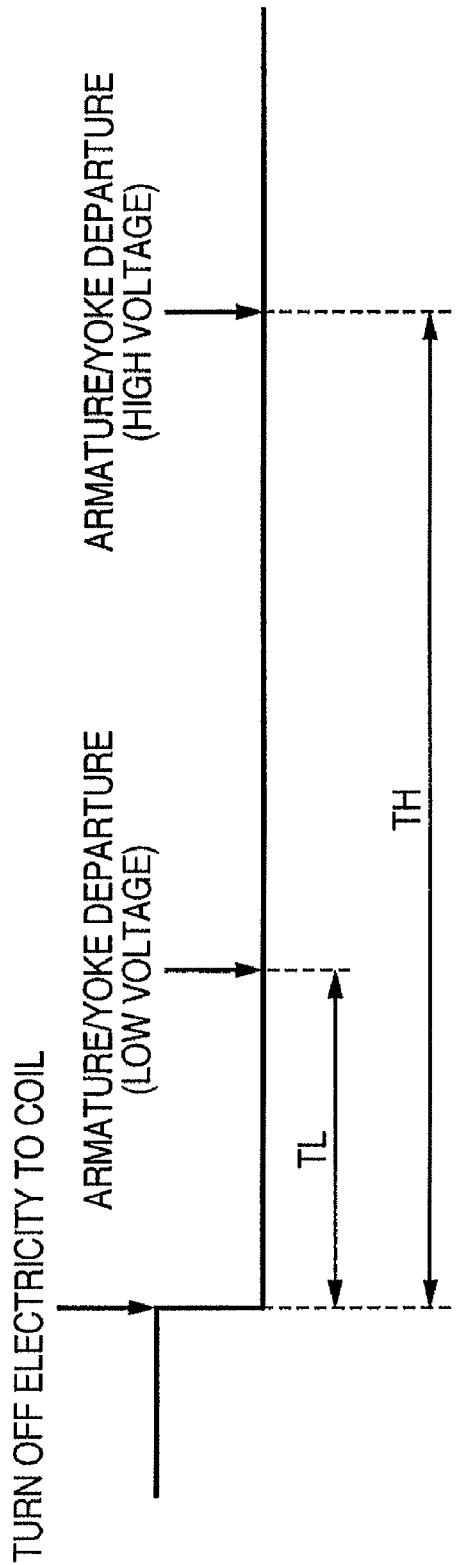

MECHANICAL SHUTTER CONTROL METHOD AND IMAGE SENSING APPARATUS

BACKGROUND OF THE INVENTION

1. Field of the Invention

The present invention relates to a control method for a mechanical shutter such as a focal plane shutter apparatus for use in a camera, and to an image sensing apparatus equipped with the mechanical shutter.

2. Description of the Related Art

Heretofore, a direct holding focal plane shutter is known that holds a shutter charged state by energizing electromagnets corresponding respectively to the first and second curtains of the shutter, and performs exposure by successively ceasing to energize the electromagnets (e.g., see Japanese Utility Model Publication No. 6-26895).

Japanese Patent Laid-Open No. 2005-283897 discloses a direct holding focal plane shutter that varies the applied voltage to the electromagnets to achieve power reduction.

Also, Japanese Patent Laid-Open No. 2001-215555 and Japanese Patent Laid-Open No. 2001-23220 disclose observing the object with a monitor such as an LCD in a camera with an image sensor such as a CDD or a CMOS sensor, by holding the second curtain with the first curtain opening the shutter (hereinafter, "electronic viewfinder (EVF) function").

Further, there are single lens reflex (SLR) digital cameras that perform the image sensing operation using both a focal plane shutter (hereinafter, "mechanical shutter") and an electronic shutter (e.g., see Japanese Patent Laid-Open No. 11-41523 (par. 0044-0050, FIGS. 1-3, etc.)). With this shutter, the second curtain is constituted by a mechanical shutter, and the reset scan of the image sensor is performed using the electronic shutter before the second curtain travels (hereinafter, "hybrid shutter"). The reset scan of the image sensor (in other words, charge accumulation start scan) is performed using a scan pattern adjusted to the traveling characteristics of the second curtain mechanical shutter (e.g., see Japanese Patent Laid-Open No. 2001-23220).

However, the following problems arise when a focal plane shutter such as disclosed by Japanese Utility Model Publication No. 6-26895 is used in an image sensing apparatus with an EVE function such as disclosed by Japanese Patent Laid-Open No. 2001-215555 and Japanese Patent Laid-Open No. 2001-23220. That is, not only is power wasted due to having to keep the electromagnet holding the second curtain energized during monitor display, but the departure timing of the electromagnets varies as a result of the electromagnets becoming heated, reducing exposure accuracy.

While use of a focal plane shutter such as disclosed in Japanese Patent Laid-Open No. 2005-283897 suppresses heating of the electromagnets, the shutter release timing varies when performing high speed image sensing, because the holding power of the electromagnets is unstable at low voltages. Consequently, using the focal plane shutter control method of Japanese Patent Laid-Open No. 2005-283897 is desirable when performing relatively low speed image sensing at which the variation in shutter release timing is virtually negligible. Since there is little room time-wise to switch voltages with high speed image sensing, Japanese Patent Laid-Open No. 2005-283897 can actually only be applied to low speed image sensing.

An image sensing apparatus that has a reflective mirror for directing incident light from the image sensing lens to a viewfinder optical system on the front of a focal plane shutter, enabling the object to be observed through a viewfinder, as with an SLR camera, will be considered next. Here, the image sensing apparatus is assumed to be able to perform both ordinary image sensing that uses both of the first and second curtains of a mechanical shutter, and hybrid shutter image sensing using an electronic first curtain and a mechanical shutter second curtain during EVF execution.

At this time, with high speed image sensing, voltage control such as shown in FIG. 12 is desired over voltage reduction in the case of ordinary image sensing for the foregoing reasons. On the other hand, with image sensing during EVF execution, a drive method such as disclosed in Japanese Patent Laid-Open No. 2005-283897 desirably is applied in order to reduce power consumption and suppress coil heating (time chart shown in FIG. 14). However, when the power reduction shown in FIG. 14 is performed for image sensing while using the EVF, the variation in shutter release timing increases, and a difference also appears in exposure between image sensing using the optical viewfinder and using the EVF. This occurs for the following reasons.

Since the electromagnets produces the self-induced electromotive force, the armature and the yoke do not depart immediately after cutting coil voltage, producing a time lag before departure as shown in FIG. 15. This time lag becomes longer as voltages increase, and becomes shorter as voltages decrease, as indicated by TH and TL in FIG. 15. Thus, a difference in exposure arises between image sensing without the EVF and image sensing with the EVF in which voltage control such as shown in FIG. 14 is performed, even at the same fast shutter speed (i.e., even when T1 in FIGS. 12 and 14 is the same).

SUMMARY OF THE INVENTION

The present invention has been made in consideration of the above situation, and has as its object to stabilize shutter exposure accuracy while reducing power consumption during execution of an electronic viewfinder function.

According to one aspect of the present invention, the foregoing object is attained by providing a control method for a mechanical shutter in an image sensing apparatus that has the mechanical shutter which includes a second curtain held in a pre-travel initial position using electric power, that performs image sensing using an image sensor, and that has an electronic viewfinder function, comprising:

a step-down step of reducing a voltage of the electric power for holding the second curtain, during execution of the electronic viewfinder function;

a step-up step of raising the voltage of the electric power for holding the second curtain if a shutter speed set for image sensing is faster than a preset period, in a case where still image sensing is instructed during execution of the electronic viewfinder function; and an image sensing step of resetting the image sensor, and causing the second curtain to travel when a period corresponding to the shutter speed has elapsed.

According to another aspect of the present invention, the foregoing object is also attained by providing a control method for a mechanical shutter in an image sensing apparatus that has the mechanical shutter which includes a second curtain held in a pre-travel initial position using electric power, that performs image sensing using an image sensor, and that has an electronic viewfinder function, comprising:

a step-down step of reducing a voltage of the electric power for holding the second curtain, during execution of the electronic viewfinder function;

a correction step of correcting a shutter speed set for image sensing based on the voltage reduced in the step-down step if the shutter speed is faster than a preset period, in a case where still image sensing is instructed during execution of the electronic viewfinder function; and an image sensing step of resetting the image sensor, and causing the second curtain to travel when a period corresponding to the shutter speed corrected in the correction step has elapsed.

According to still another aspect of the present invention, the foregoing object is also attained by providing an image sensing apparatus having an electronic viewfinder function, comprising:

an image sensor that senses an image;

a mechanical shutter including a second curtain held in a pre-travel initial position using electric power; and a shutter control unit that controls the mechanical shutter, wherein the shutter control unit holds the second curtain in the initial position in order to execute the electronic viewfinder function, reduces a voltage of the electric power for holding the second curtain during execution of the electronic viewfinder function, raises the voltage of the electric power for holding the second curtain if a shutter speed set for image sensing is faster than a preset period in a case where still image sensing is instructed during execution of the electronic viewfinder function, and controls the mechanical shutter when a period corresponding to the shutter speed has elapsed after resetting of the image sensor.

According to yet another aspect of the present invention, the foregoing object is also attained by providing an image sensing apparatus having an electronic viewfinder function, comprising:

an image sensor that senses an image;

a mechanical shutter including a second curtain held in a pre-travel initial position using electric power; and a shutter control unit that controls the mechanical shutter, wherein the shutter control unit holds the second curtain in the initial position in order to execute the electronic viewfinder function, reduces a voltage of the electric power for holding the second curtain during execution of the electronic viewfinder function, corrects a shutter speed set for image sensing based on the reduced voltage if the shutter speed is faster than a preset period in a case where still image sensing is instructed during execution of the electronic viewfinder function, and controls the mechanical shutter so that the second curtain travels when a period corresponding to the corrected shutter speed has elapsed after resetting of the image sensor.

Additional features of the present invention will become apparent from the following description of exemplary embodiments, taken in conjunction with the accompanying drawings.

BRIEF DESCRIPTION OF THE DRAWINGS

FIG. 12 is a time chart showing a voltage control on a focal plane shutter in the case of conventional image sensing without using an EVF.

FIG. 13 is a time chart showing another voltage control for a focal plane shutter in the case of conventional image sensing without using an EVF;

FIG. 14 is a time chart showing an exemplary voltage control on a focal plane shutter when image sensing is performed during executing an EVF; and FIG. 15 is a time chart showing conventional differences in armature/yoke departure timing due to differences in coil voltage.

DESCRIPTION OF THE EMBODIMENTS

Preferred embodiments of the present invention will be described in detail in accordance with the accompanying drawings. The dimensions, shapes and relative positions of the constituent parts shown in the embodiments should be changed as convenient depending on various conditions and on the structure of the apparatus adapted to the invention, and the invention is not limited to the embodiments described herein.

(Configuration of Image Sensing System)

Figure 1:
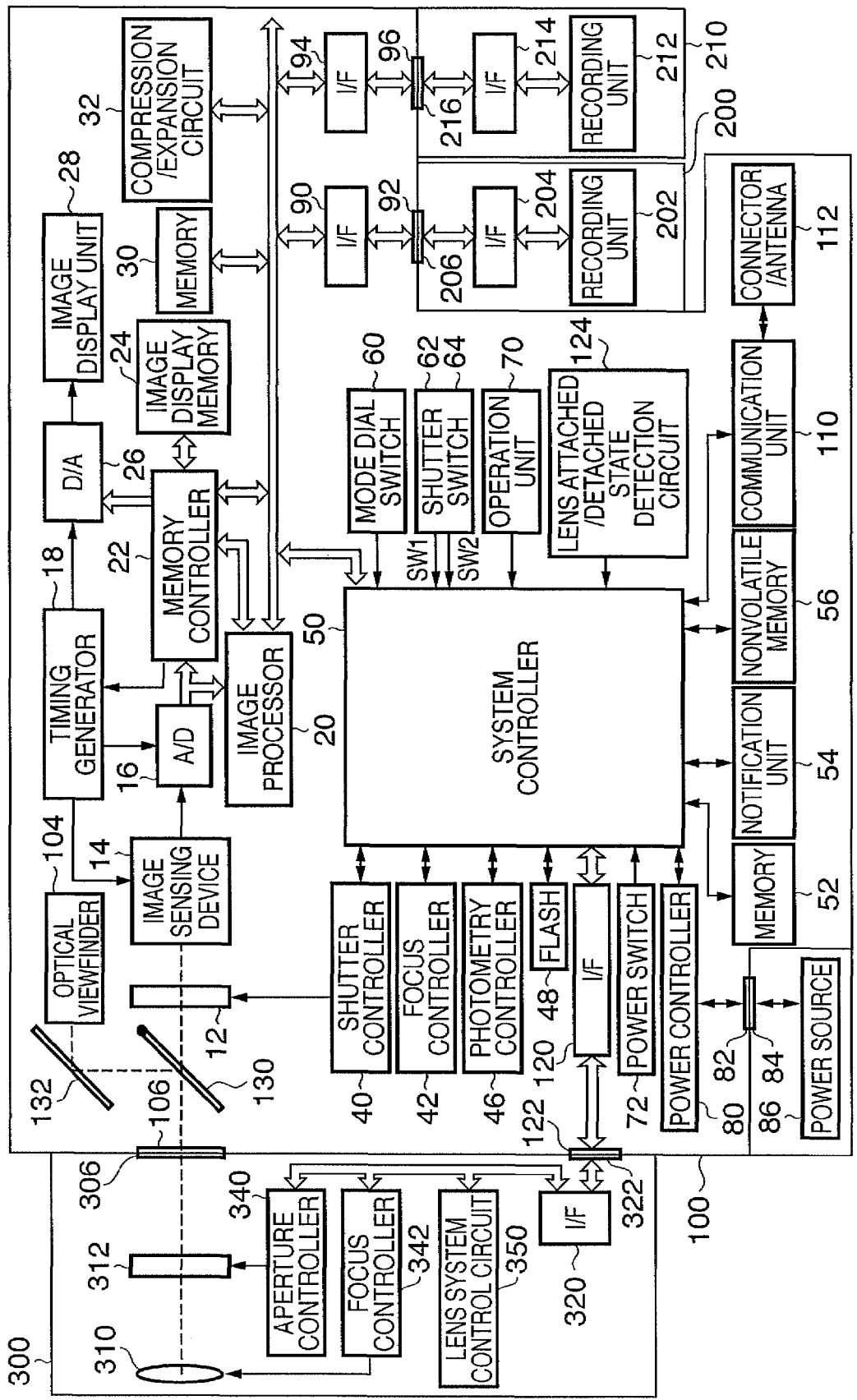
FIG. 1 is a block diagram showing the configuration of an image sensing apparatus according to preferred embodiments of the present invention.

FIG. 1 is a block diagram showing the configuration of an image sensing system according to an embodiment of the present invention. As shown in FIG. 1, the image sensing system of the present embodiment is configured primarily by a camera body 100 and an interchangeable lens unit 300.

In FIG. 1, the lens unit 300, detachable from the camera body 100 and having a zoom mechanism and focus control mechanism (both not shown), is mounted.

In the lens unit 300, reference numeral 310 denotes an image sensing lens; 312, an aperture; and 306, a lens mount that mechanically joins the lens unit 300 to the camera body 100. The lens mount 306 and a camera mount 106 (will be described later) in the camera body 100 have shapes that enable to join to each other, such as flanges. By connecting the lens mount 306 and the camera mount 106, the lens unit 300 is mounted to the camera body 100.

Further, with a lens signal connector 322 of the lens unit 300 being connected to the camera signal connector 122 of the camera body 100, the lens unit 300 and the camera body 100 are electrically connected. The lens signal connector 322 is provided with functions for transmitting control signals, status signals, data signals and the like between the camera body 100 and the lens unit 300, as well as for supplying or for being supplied with a variety of voltages and currents. In addition, the lens signal connector 322 may be configured not just for propagating electronic communication but also for fiber-optic communication, audio communication, and the like.

Reference numeral 340 denotes an aperture controller that controls the aperture 312 in conjunction with a shutter controller 40 for controlling a shutter 12 of the camera body 100 (described later), based on photometric information from a photometry controller 46. Reference numeral 342 denotes a focus controller that controls the focusing of the image sensing lens 310.

Reference numeral 350 denotes a lens system controller that controls the overall lens unit 300. The lens system controller 350 is provided with a memory for storing constants, variables, programs and the like needed for operation. Further, the lens system controller 350 is also provided with a nonvolatile memory for storing, for example, identification information such as a number unique to the lens unit 300, management information, function information such as maximum and minimum aperture values and the focal length, and current and past setting values.

The aperture controller 340, the focus controller 342 and the lens system controller 350 can communicate with the camera body 100 via an interface 320 and the lens signal connector 322. A lens attached/detached state detector 124 in the camera body 100 detects the attached/detached state of the lens unit 300.

The configuration of the camera body 100 is described next.

Reference numeral 106 denotes the lens mount for mechanically joining the camera body 100 and the lens unit 300; and 124, the lens attached/detached state detector which detects attached/detached state of the lens unit 300 and a detection signal is inputted to a system controller 50 (will be described later).

Reference numerals 130 and 132 denote mirrors that direct light beams incident on the image sensing lens 310 to an optical viewfinder 104 using a single-lens reflex (SLR) system. Note that the mirror 130 may be either a quick-return mirror or a half mirror. Here, it is assumed that the mirror 130 is a quick-return mirror. The quick return mirror reflects upwardly the light passed through the image sensing lens 310 (referred to as "incoming light", hereinafter) in a mirror-down state (state shown in FIG. 1). The incoming light is then directed to the optical viewfinder 104 for confirming an image of an object via the mirror 132. A pentaprism may be used in place of the mirror 132.

In a mirror-up state (not shown), the incoming light is not reflected by the quick return mirror 130, and is directed to an image sensing device 14 via a mechanical shutter 12 which is controlled by the shutter controller 40. Thus, the quick return mirror 130 switches the path of the incoming light. If the mirror 130 is configured by a fixed half-mirror, the incoming light is split into two beams, with one being directed to the mirror 132 and the other being directed to the image sensing device 14.

Reference numeral 14 denotes an image sensing device that converts optical images formed on its image sensing surface to electrical signals. Reference numeral 16 denotes an A/D converter which converts an analog signal output from the image sensing device 14 into a digital signal; 18, a timing generator which supplies a clock signal and a control signal respectively to the image sensing device 14, the A/D converter 16 and a D/A converter 26, under the control of a memory controller 22 and a system controller 50.

After the electrical signal output from the image sensing device 14 is converted into image data by the A/D converter 16, the image data is inputted to the image processor 20 or the memory controller 22. The image processor 20 performs predetermined image processing, such as pixel interpolation processing, color conversion processing and the like, on the image data from the A/D converter 16 or image data from the memory controller 22.

The memory controller 22 controls the A/D converter 16, the timing generator 18, the image processor 20, an image display memory 24, the D/A converter 26, a memory 30 and a compression/expansion circuit 32. Further, the memory controller 22 controls to write the image data outputted from the A/D converter 16 into the memory 30 or the image display memory 24 and to read the image data from the memory 30 or the image display memory 24.

Reference numeral 24 denotes an image display memory; 26, the D/A converter; and 28, an image display unit comprising a TFT LCD (Liquid Crystal Display) or the like. Image data written into the image display memory 24 is displayed on the image display unit 28 via the D/A converter 26. An electronic view finder (EVE) function is realized by sequentially displaying obtained images on the image display unit 28. Further, the image display unit 28 arbitrarily turns ON/OFF its display in accordance with an instruction from the system controller 50. If the display is turned OFF, the power consumption of the camera body 100 can be greatly reduced.

The memory 30, used for storing obtained image data, has a sufficient storage capacity for storing image data of a predetermined number of images. The memory 30 may be used as a work area for the system controller 50.

The compression/expansion circuit 32 compresses or expands image data using a known compression method, such as adaptive discrete cosine transformation (ADCT). The compression/expansion circuit 32 reads image data stored in the memory 30 and performs compression or expansion processing on the read image data, and writes the processed data into the memory 30.

The system controller 50 controls the overall camera body 100 and incorporates a known CPU, for instance. The system controller control the overall camera body 100 in accordance with programs, constants, and variables stored in a memory 52.

One of the control by the system controller 50 is to generate control signals used for through-the-lens (TTL) auto focus (AF) processing, auto exposure (AE) processing, pre-flash (EF) processing. The generated control signals are provided to the shutter controller 40, a focus controller 42, the photometry controller 46, and a flash 48.

The focus controller 42 generates a signal for focusing on an object based on the control signal from the system controller 50. The generated signal is sent to the focus controller 342 via the system controller 50, an I/F 120, the signal connectors 122 and 322 and the I/F 320, and drives the focus mechanism of the image sensing lens 310 so as bring the object into focus.

The photometry controller 46 measures the intensity of the incoming light. The system controller 50 determines an exposure period and an f-value based on the photometry value measured by the photometry controller 46, and send to control signals to the shutter controller 40 and the aperture controller. Based on the control signals from the system controller 50, the shutter controller 40 adjusts the exposure period by the mechanical shutter 12 and the aperture controller 340 controls the aperture 312, thereby an exposure amount is controlled. Further, for controlling the exposure amount using the electronic shutter, reset scan of the image sensing device 14 is performed by controlling the timing generator 18.

The flash 48 has an AF auxiliary light emission function and a flash adjustment function, and emits flash light of a quantity of light based on a control signal from the system controller 50.

The system controller 50 also controls to notify a user of information such as a set image sensing mode and operating statuses, messages and the like via a notification unit 54. The notification unit 54 comprises one or more combinations of display devices including an LCD, LED or the like or an audio element so that it can notify the operating statuses and the messages by using characters, images, sound and the like. Further, a part of functions of the notification unit 54 is provided within an optical viewfinder 104.

The display contents of the notification unit 54, displayed on the LCD or the like, include indication relating to an image sensing mode, such as single shot/sequential image sensing, and a self timer. The display contents also include indication relating to recording, such as a compression rate, the number of recording pixels, the number of recorded images, and the number of recordable images. Further, the display contents also include indication relating to image sensing conditions, such as a shutter speed, an f number (aperture), exposure compensation, flash illumination, and red-eye reduction. Other than the above, the display contents also include indication of macro image sensing, a buzzer-set state, a timer battery level, a battery level, an error state, information of plural digit numbers, attached/detached status of recording media 200 and 210, attached/detached status of lens unit 300, operation of communication I/F, date and time, and connection conditions with external computers.

Further, the display contents of the notification unit 54, displayed within the optical viewfinder 104, include indication of a focus state, an image sensing ready state, a camera shake warning, a flash charge state, a flash ready state, the shutter speed, the f number (aperture), the exposure compensation, and a writing state to a recording medium.

Furthermore, the display contents of the notification unit 54, displayed on the LCD or the like, include indication of a focus state, an image sensing ready state, a camera shake warning, a flash charge state, a flash ready state, a writing state to a recording medium, a macro image sensing settings, and secondary battery charge state.

Further, the display contents of the notification unit 54, displayed by a lamp or the like, include indication of self-timer or the like. The lamp used for indication of self timer may be also used as an AF auxiliary light.

The system controller 50 further controls transmission and reception of image data to/from an external device via a communication unit 110. The communication unit 110 has various communication functions for RS232C, USB, IEEE 1394, SCSI, modem, LAN, and wireless communication. A connector/antenna 112 functions as a connector when the camera body 100 is connected to another device via the communication unit 110, and as an antenna for wireless communication.

A mode dial switch 60, a shutter switch 62, an operation unit 70, and a power switch 72 are used for inputting operation designation to the system controller 50.

The mode dial switch 60 switches between various image sensing modes, such as an automatic image sensing mode, a programmed image sensing mode, a shutter-speed-priority image sensing mode, an aperture-priority image sensing mode, a manual image sensing mode, a depth-priority image sensing mode, a portrait image sensing mode, a landscape image sensing mode, a close-up image sensing mode, a sport image sensing mode, a night view image sensing mode, and a panoramic image sensing mode.

The shutter switch 62 is a multi-stage switch comprising a switch SW1 and a switch SW2. When the shutter switch 62 is pressed for a predetermined amount (e.g., half stroke), the switch SW1 is turned ON, and with further pressing of the shutter switch 62 (e.g., full stroke), the switch SW2 is turned on. Turning-on of the switch SW1 instructs start of the operations of the AF processing, the AE processing, the EF processing and the like. Further, turning-on the switch SW2 instructs start of a series of operations of exposure processing, development processing and recording processing since a signal is read from the image sensing device 14 until the read signal is recorded as image data on the recording medium 200 or 210. In the exposure processing, the quick return mirror 130 is flipped up, drives the mechanical shutter 12, a signal is read from the image sensing device 14, and the read signal is written into the memory 30, via the A/D converter 16 and the memory controller 22. Then the development processing is performed using calculations by the image processor 20 and the memory controller 22, and the processed image data is again written into the memory 30. In the recording processing, the image data is read from the memory 30 and compressed by the compression/expansion circuit 32, and the compressed image data is written into the recording medium 200 or 210.

Numeral 70 denotes an operation unit comprising various buttons and dials, including a menu button, a set button, a playback button, a delete button, a jump button, an exposure correction button, a single-shot/sequential mode selection button, an exposure mode selection button, an AF mode selection button, a WB mode selection button, an ISO sensitivity setting button, a main electronic dial, and a sub electronic dial. When a menu button is pressed, for example, a setting screen is displayed on the notification unit 54, and a desired item can be selected on the displayed screen using the above-described buttons.

Variables, modes and the like set by the mode dial switch 60 and the operation unit 70 are stored in the nonvolatile memory 56 configured of EEPROM.

Further, by operating a standard setting state set unit included in the operation unit 70, a user can set desired setting states (e.g., setting states of, inter alia, image sensing mode, exposure correction value, single-shot/sequential mode, photometry mode, AF mode, WB mode, ISO sensitivity) as a standard setting state. Data of the standard setting state is stored in the nonvolatile memory 56.

Reference numeral 72 denotes the power switch capable of switching between ON/OFF of the camera body 100. The power switch 72 can also set ON/OFF of peripheral devices, connected to the camera body, such as the lens unit 300, external flash, the recording media 200 and 210, and the like.

The system controller 50 is provided with power from a power controller 80. The power controller 80 then provides power from a power source 86 to the respective units based on designation from the system controller 50. The power controller 80 and the power source 86 are connected via the connectors 82 and 84. The power source 86 comprises a primary battery such as an alkaline battery, a secondary battery such as an Li-ion battery or an NiMH battery, an AC adapter, or the like.

The image data written to the memory 30 (compressed image data) is written to the recording medium 200 or 210 connected via an interface (I/F) 90 or 94 and a connector 92 or 96.

Each of the recording media 200 and 210 comprises a memory card, a hard disk or the like. The recording media 200 and 210 respectively have recording units 202 and 212 of semiconductor memory, magnetic disks or the like, the interfaces 204 and 214 for communication with the camera body 100, and the connectors 206 and 216 for connection with the camera body 100.

In the present embodiment, two systems of interfaces and connectors for connection with the recording media are employed. However, the number of systems is not limited, and a single or plurality of systems of interfaces and connectors may be provided.

Note that while an interchangeable lens digital SLR camera is described as the image sensing apparatus in the present embodiment, the image sensing apparatus may be a so-called digital compact camera in which the lens and the lens barrel are integrated into the body of the camera.

(Configuration of Mechanical Shutter)

Figure 2:
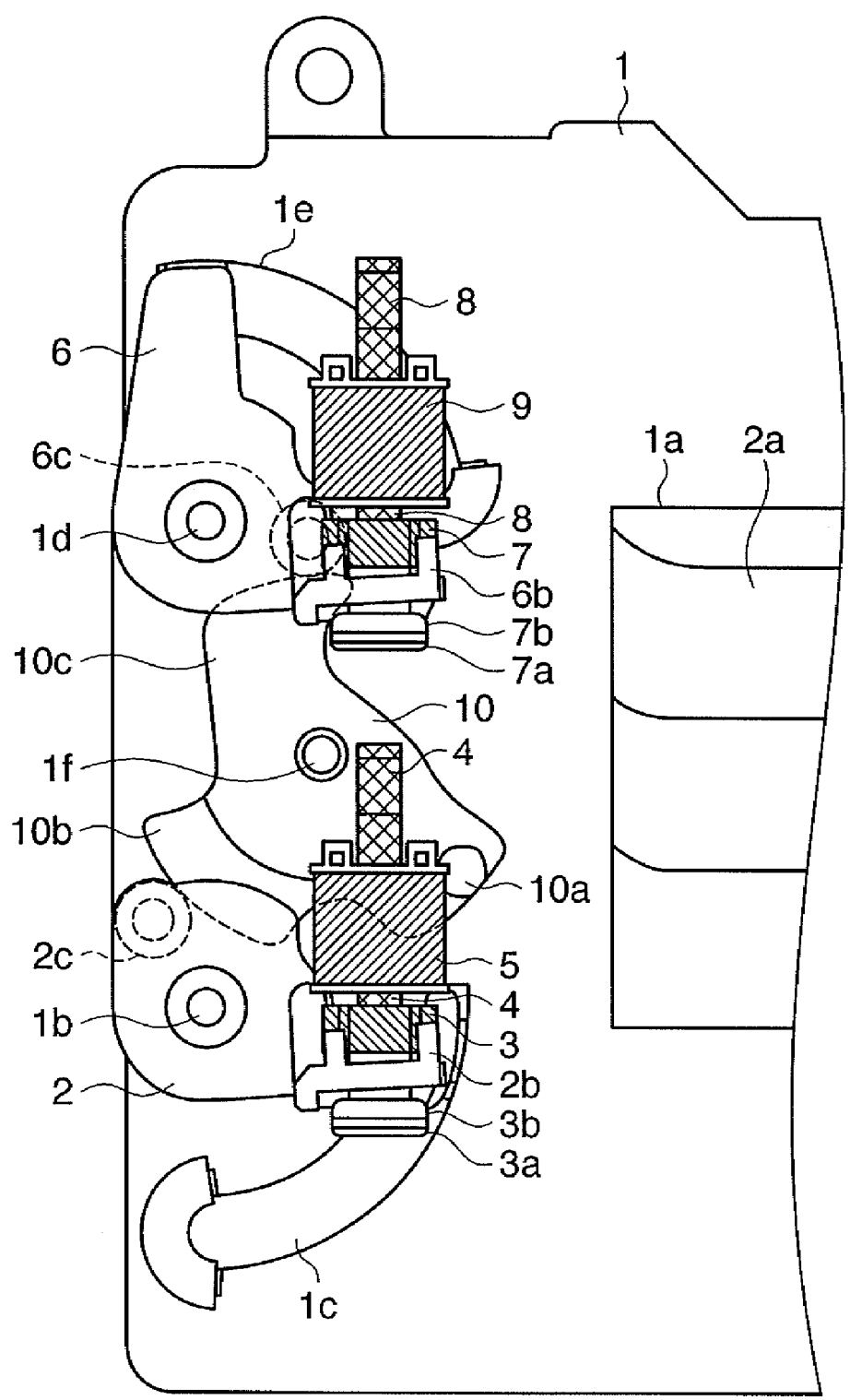
FIG. 2 is a plan view showing a charged state of a focal plane shutter according to preferred embodiments of the present invention.
Figure 3:
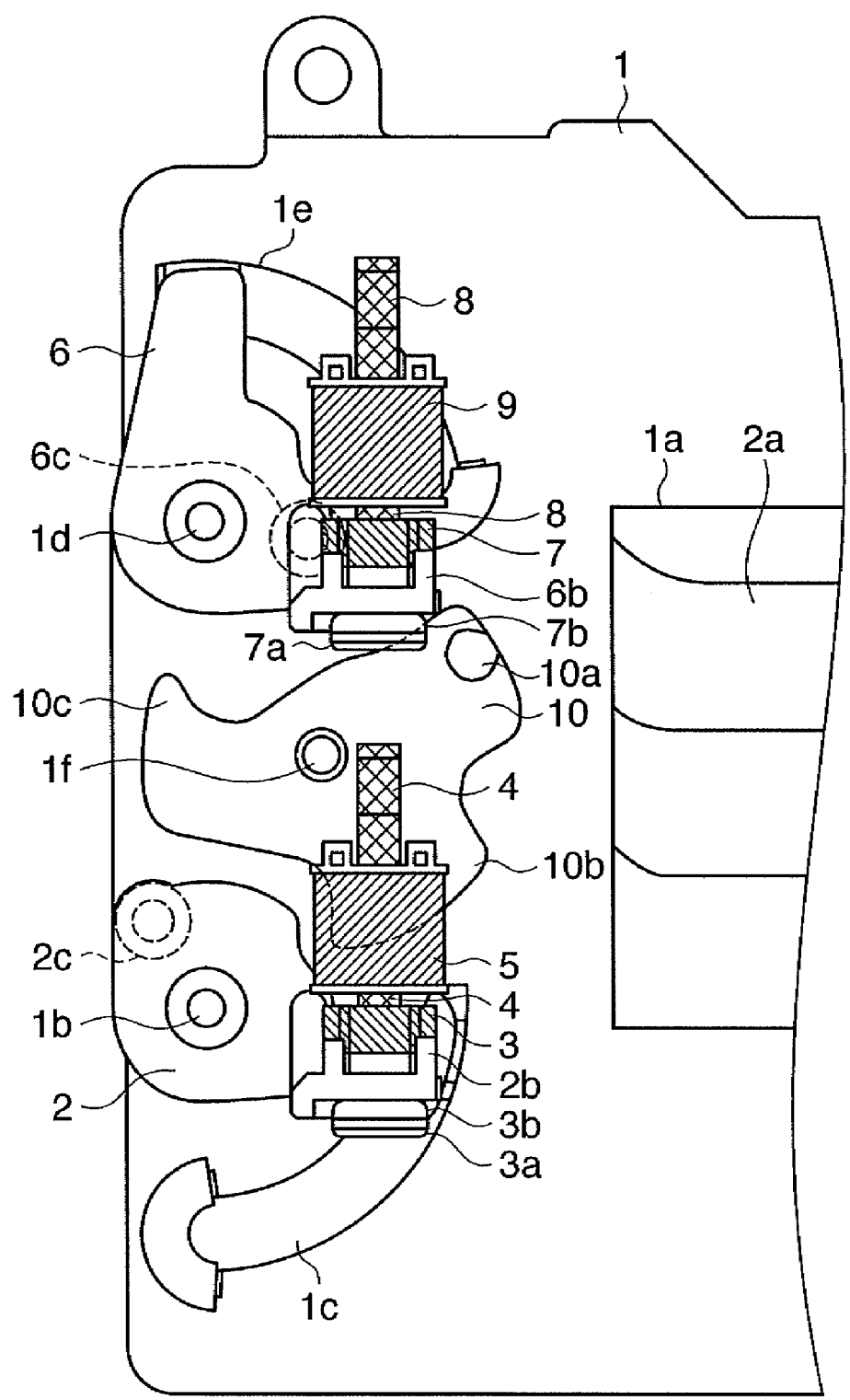
FIG. 3 is a plan view showing a pre-travel standby state of the focal plane shutter according to preferred embodiments of the present invention.
Figure 4:
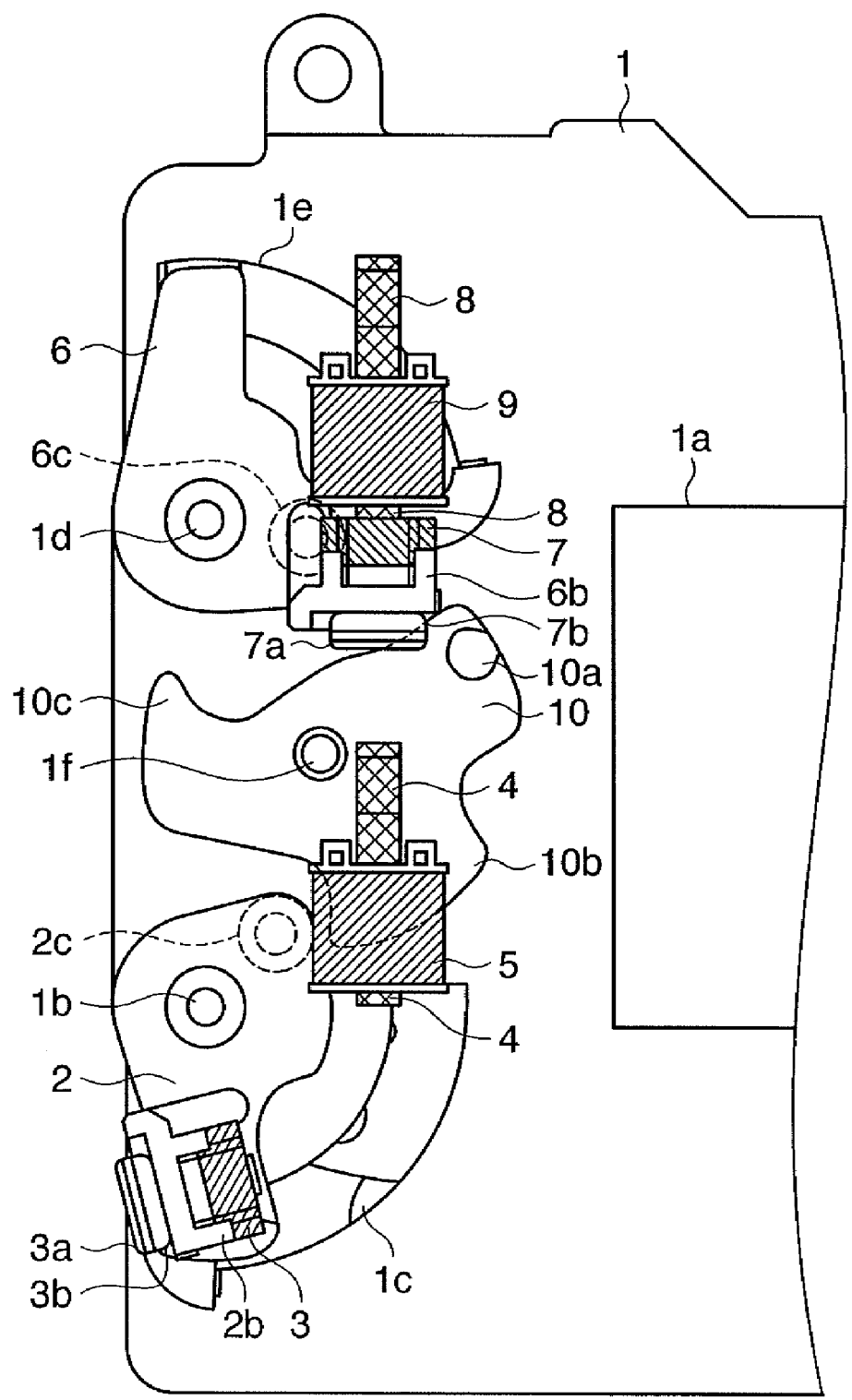
FIG. 4 is a plan view showing a first curtain traveled state of the focal plane shutter according to preferred embodiments of the present invention.
Figure 5:
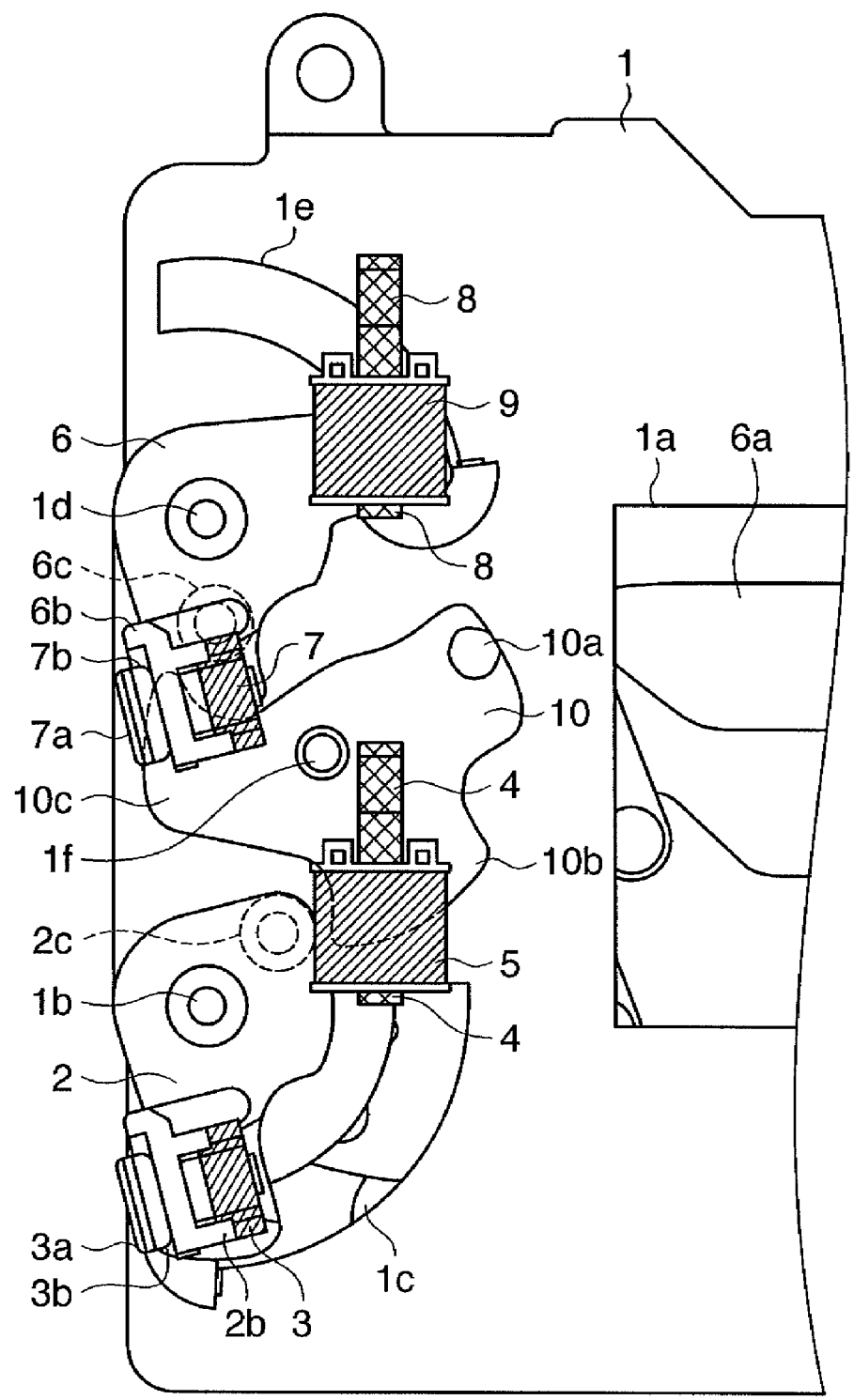
FIG. 5 is a plan view showing a second curtain traveled state of the focal plane shutter according to preferred embodiments of the present invention.

The configuration of the mechanical shutter 12 will be described next with reference to FIGS. 2 to 5. FIGS. 2 to 5 are plan views showing a substantially left half portion as seen from the object side, with the mechanical shutter 12 built into the camera body 100. FIG. 2 shows a charged state, that is, a state in which the first and second curtains have been charged by a charge lever (described below). FIG. 3 shows a pre-travel standby state in which the first and second curtains are held in an initial position with electric power using yokes and coils (described below). FIG. 4 shows a state after the first curtain has traveled, while FIG. 5 shows a state after the second curtain has traveled.

In FIGS. 2 to 5, reference numeral 1 denotes a shutter base plate, and the various components constituting the drive mechanism of first blades 2a and second blades 6a (FIG. 5) are attached thereto. Reference numeral 1a denotes an aperture, formed in the shutter base plate 1, through which luminous flux from the object passes.

A first curtain drive lever (drive member) 2 is rotatably supported by a first curtain shaft 1b provided on the surface of the shutter base plate 1. A torsion coil spring (not shown) is disposed on the outer circumference of the first curtain shaft 1b. This torsion coil spring is biased in the clockwise direction of FIG. 2 (direction in which the first blades 2a travel).

A first curtain drive pin (not shown) is formed at a front end portion of the first curtain drive lever 2. The first curtain drive pin engages a first curtain drive arm (not shown) through a first curtain groove 1c formed in the shutter base plate 1. The first curtain drive arm is coupled to the first blades 2a via a link mechanism. The first blades 2a are constituted by a plurality of shutter blades.

When the first curtain drive pin moves along the first curtain groove 1c due to the rotation of the first curtain drive lever 2, the first curtain drive arm rotates to fan out and fold up the first blades 2a. Note that the rotational range of the first curtain drive lever 2 is restricted by the first curtain groove 1c.

A first curtain armature supporting portion 2b is provided on the first curtain drive lever 2. A through hole (not shown) formed in the first curtain armature supporting portion 2b has a flange that is larger than the inner diameter of the through hole, and a first curtain armature shaft 3a integrally attached to a first curtain armature 3 engages the through hole. The first curtain armature shaft 3a extends substantially orthogonally to the adhesion surface of the first curtain armature 3.

A compression spring (not shown) is disposed on the outer circumference of the first curtain armature shaft 3a, between the first curtain armature 3 and the first curtain armature supporting portion 2b, and is biased in a direction that separates the first curtain armature 3 and the first curtain armature supporting portion 2b (vertical direction in FIG. 2).

Reference numeral 3b denotes elastically deformable first curtain shock absorption rubber (shock absorption member) which is disposed on a plane substantially orthogonal with the longitudinal direction of the first curtain armature shaft 3a, between the first curtain armature supporting portion 2b and the first curtain armature shaft 3a. The first curtain shock absorption rubber 3b elastically deforms to prevent the first curtain armature supporting portion 2b from directly bumping up against the first curtain armature shaft 3a when moving from the charged state (first state) to the travel start state (second state). Thus, any impact on the first curtain armature shaft 3a by the first curtain armature supporting portion 2b is thus absorbed.

Reference numeral 4 denotes a first curtain yoke (electromagnetic member), and reference numeral 5 denotes a first curtain coil (electromagnetic member) provided on the outer circumference of the first curtain yoke 4. A magnetic force can be generated in the first curtain yoke 4 by applying a voltage to the first curtain coil 5, enabling the first curtain armature 3 to be adhered by this magnetic force.

A second curtain drive lever (drive member) 6 is rotatably supported by a second curtain shaft 1d provided on the surface of the shutter base plate 1. A torsion coil spring (not shown) is disposed on the outer circumference of the second curtain shaft 1d. This torsion coil spring biases the second curtain drive lever 6 in the clockwise direction of FIG. 2 (direction in which second blades travel).

A second curtain drive pin (not shown) is formed at a front end portion of the second curtain drive lever 6. The second curtain drive pin engages a second curtain drive arm (not shown) through a second curtain groove 1e formed in the shutter base plate 1. The second curtain drive arm is coupled to the second blades 6a (in a folded state in FIGS. 2-4) via a link mechanism. The second blades 6a are constituted by a plurality of shutter blades.

When the second curtain drive pin moves along the second curtain groove 1e as a result of the rotation of the second curtain drive lever 6, the second curtain drive arm rotates to fan out and fold up the second blades 6a. The aperture 1a can be opened (luminous flux from the object is allowed to pass) and closed (luminous flux from the object is mostly blocked) by the forgoing operation of the first blades 2a and this operation of the second blades 6a. Note that the rotational range of the second curtain drive lever 6 is restricted by the second curtain groove 1e.

A second curtain armature supporting portion 6b is provided on the second curtain drive lever 6. A through hole (not shown) formed in second curtain armature supporting portion 6b has a flange that is larger than the inner diameter of the through hole, and a second curtain armature shaft 7a integrally attached to a second curtain armature 7 engages the through hole. The second curtain armature shaft 7a extends substantially orthogonally to the adhesion surface of the second curtain armature 7.

A compression spring (not shown) is disposed on the outer circumference of the second curtain armature shaft 7a between the second curtain armature 7 and the second curtain armature supporting portion 6b, and is biased in a direction that separates the second curtain armature 7 and the second curtain armature supporting portion 6b (vertical direction in FIG. 2).

Reference numeral 7b denotes elastically deformable second curtain shock absorption rubber (shock absorption member) which is disposed on a plane substantially orthogonal with the longitudinal direction of the second curtain armature shaft 7a, between the second curtain armature supporting portion 6b and the second curtain armature shaft 7a. Any impact on the second curtain armature shaft 7a by the second curtain armature supporting portion 6b is absorbed as a result of the second curtain shock absorption rubber 7b elastically deforming to prevent the second curtain armature supporting portion 6b from directly bumping up against the second curtain armature shaft 7a when moving from the charged state to the travel start state.

Reference numeral 8 denotes a second curtain yoke (electromagnetic member), and reference numeral 9 denotes a second curtain coil (electromagnetic member) provided on the outer circumference of the second curtain yoke 8. A magnetic force can be generated in the second curtain yoke 8 by applying a voltage to the second curtain coil 9, enabling the second curtain armature 7 to be adhered by this magnetic force.

Reference numeral 10 denotes a charge lever which is rotatably supported by a charge lever shaft 1f provided on the shutter base plate 1. The charge lever 10 is coupled to a drive lever member (not shown) via a charge pin 10a. This drive lever member rotates on receiving the drive force of a drive source.

A cam 10b formed on the charge lever 10 contacts a first curtain charge roller 2c provided on the first curtain drive lever 2 and rotates the first curtain drive lever 2, according to the rotation of the charge lever 10. Specifically, the cam 10b of the charge lever 10 rotates the first curtain drive lever 2 in a counter clockwise direction after the first blades 2a have fully traveled as shown in FIG. 4 (i.e. when the first blades 2a are folded up). As a result, the mechanical shutter 12 passes through the pre-travel standby state shown in FIG. 3 to the charged state shown in FIG. 2.

A cam 10c formed on the charge lever 10 contacts a second curtain charge roller 6c provided on the second curtain drive lever 6 and rotates the second curtain drive lever 6, according to the rotation of the charge lever 10. Specifically, the cam 10c of the charge lever 10 rotates the second curtain drive lever 6 in a counter clockwise direction after the second blades 6a have fully traveled as shown in FIG. 5 (i.e. when the second blades 6a are fanned out). As a result, the mechanical shutter 12 passes through the pre-travel standby state shown in FIG. 3 to the charged state shown in FIG. 2.

First Embodiment

A first embodiment of the present invention will be described next. In the first embodiment, control of the mechanical shutter 12 and the pixel reset scan (electronic first curtain) of the image sensing device 14 when image sensing is performed in an image sensing system having the forgoing configuration will be described in accordance with the flowchart of FIG. 6. Note that this control is performed as a result of the shutter controller 40 controlling the mechanical shutter 12 and the timing generator 18 controlling the image sensing device 14, based on instructions from the system controller 50.

Electronic Viewfinder (EVF)

When an EVF button included in the operation unit 70 is pressed, a mirror-up operation of the quick return mirror 130 is performed, the first curtain coil 5 and the second curtain coil 9 are energized, and the charge level 10 rotates counter clockwise. The first curtain charge roller 2c and the second curtain charge roller 6c are then separated from the cams 10a and 10b of the charge level 10, and the mechanical shutter 12 shifts to the pre-travel standby state shown in FIG. 3. Turning off electricity to the first coil makes the mechanical shutter 12 shift to the state that opens the aperture 1a to direct luminous flux from the object to the image sensing device 14 (state shown in FIG. 4), and starts the EVF using the image display unit 28.

Figure 7:
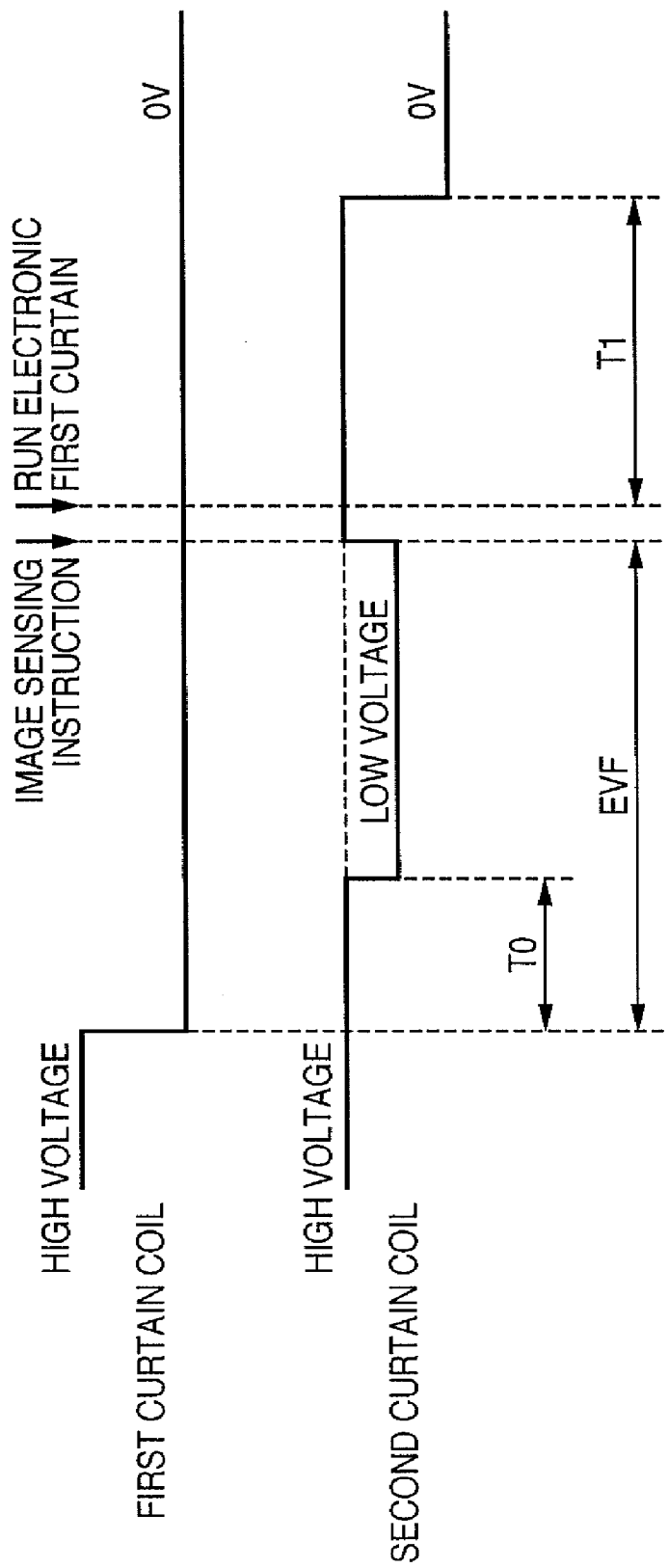
FIG. 7 is a time chart showing a fast shutter speed voltage control on the focal plane shutter during executing EVF according to the first embodiment of the present invention.

The voltage to the second coil is reduced from a high voltage to a low voltage after a voltage switching period T0 has elapsed from when the EVF was started (FIG. 7 or 14). The voltage switching period T0 is necessary because if the second curtain coil 9 is driven at a low voltage when the first curtain travels without setting the voltage switching period T0, the second curtain armature 7 and the second curtain yoke 8 may depart at the impact when the first blades 2a fully travel.

Non-EVF Image Sensing

Firstly, the operation of the mechanical shutter 12 where image sensing is performed while observing the object with the optical viewfinder 104 without using the EVF (hereinafter, "non-EVF image sensing") will be described with reference to FIGS. 2-6, 12 and 13.

Figure 6:
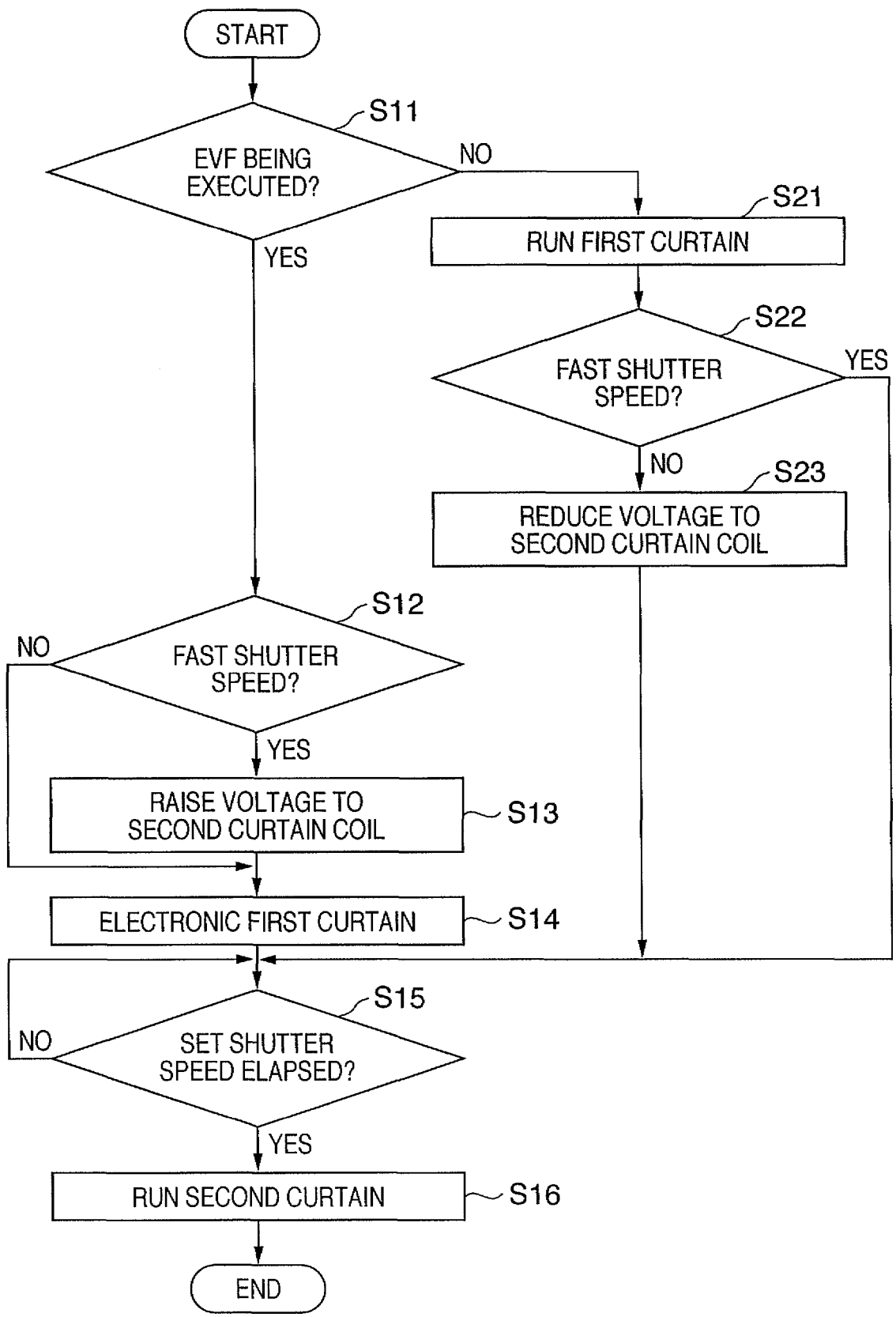
FIG. 6 is a flowchart illustrating a shutter control according to a first embodiment of the present invention.

When the shutter switch 62 is pressed, it is judged in step S11 of FIG. 6 whether the EVF is being executed. If the EVF is not being executed (NO in step S11), non-EVF image sensing is performed.

Since the shutter switch 62 is pressed with the mechanical shutter 12 in the state shown in FIG. 2 in the case of non-EVF image sensing, the mirror-up operation of the quick return mirror 130 is performed, the first curtain coil 5 and the second curtain coil 9 are energized, and the charge lever 10 rotates counter clockwise. The first curtain charge roller 2c and the second curtain charge roller 6c are thus separated from the cams 10b and 10c of the charge level 10, and the mechanical shutter 12 shifts to the pre-travel standby state shown in FIG. 3. The first curtain drive lever 2 and the second curtain drive lever 6 do not rotate, since the first curtain armature 3 and the second curtain armature 7 are being electromagnetically adhered, as shown in FIG. 3.

Turning off electricity to the first curtain coil 5 causes the first blades 2a to travel, opening the aperture 1a (step S21). Then, the second blades 6a are made to travel to occlude the aperture 1a by turning off electricity to the second curtain coil 9 after a time interval T1 corresponding to the shutter speed set by the operation unit 70 has elapsed (YES in step S15). If, at this time, the set shutter speed is a fast shutter speed (e.g., 1/8000 sec) (YES in step S22), electricity to the second curtain coil 9 is turned off directly from a high voltage as shown in FIG. 12.

On the other hand, if the set shutter speed is a slow shutter speed (e.g., 1 sec) (NO in step S22), electricity to the second curtain coil 9 is reduced from a high voltage to a low voltage after a voltage switching period T0 has elapsed from when electricity to the first curtain coil 5 was turned off, as shown in FIG. 13 (step S23). After a period T1 corresponding to the shutter speed has elapsed (YES in step S15), the voltage is then turned off (step S16).

Note that the judgment in step S22 as to whether the shutter speed is a fast shutter speed may be carried out by judging whether the shutter speed is faster or slower than a preset shutter speed, and is not limited to 1/8000 sec or 1 sec.

The mechanical shutter 12 is then returned to the charged state of FIG. 2 by rotating the charge lever 10 clockwise so that the cams 10b and 10c press against the first curtain charge roller 2c and the second curtain charge roller 6c (hereinafter, "charge operation").

Image Sensing During EVF Execution

Next, controls on the mechanical shutter 12 and the electronic first curtain when performing hybrid shutter image sensing during EVF execution will be described with reference to FIGS. 2-7 and 14.

When the shutter switch 62 is pressed, it is judged in step S11 whether the EVF function is being executed. Here, since the EVF function is being executed (YES in step S11), it is then judged in step S12 whether the set shutter speed is a fast shutter speed (e.g., 1/8000 sec). Note that the judgment as to whether the shutter speed is fast may be carried out by judging whether the shutter speed is faster or slower than a preset shutter speed, and is not limited to 1/8000 sec. The shutter speed preset for use in the judgment can be set appropriately in view of differences in the size of the time lag before the armature and the yoke depart due to differences in the voltage supplied to the second curtain coil 9.

If the set shutter speed is a fast shutter speed (e.g., 1/8000 sec) (YES in step S12), as shown in FIG. 7, the applied voltage to the second curtain coil 9 is raised to a high voltage (step S13), and then the pixels are reset using the electronic first curtain (step S14). Then after a period T1 corresponding to the set shutter speed has elapsed (YES in step S15), the voltage is turned off (step S16).

On the other hand, if the set shutter speed is slow (e.g., 1 sec) (NO in step S12), after a period T1 corresponding to the set shutter speed has elapsed (YES in step S15), the voltage to the second curtain coil 9 is turned off directly from a low voltage state, as shown in FIG. 14 (step S16).

The second blades 6a travel when electricity to the second curtain coil 9 is turned off, shifting to the state of FIG. 5 occluding the aperture 1a.

A similar charge operation to non-EVF image sensing is then performed, returning the mechanical shutter 12 to the charged state of FIG. 2.

As aforementioned, with high speed image sensing such as 1/8000 sec., the voltage control shown in FIG. 12 is performed in the case of non-EVF image sensing, and the voltage control shown in FIG. 7 is performed in the case of image sensing during EVF execution. Here, T1 in FIGS. 7 and 12 corresponds to a shutter speed such as 1/8000 sec, with the voltage step-up operation only being performed in the case of image sensing during EVF execution.

With slow speed image sensing such as 1 sec, the voltage control shown in FIG. 13 is performed in the case of non-EVF image sensing, and the time chart shown in FIG. 14 is used in the case of image sensing during EVF execution. Similarly to a fast shutter speed, with a slow shutter speed, T1 in FIGS. 13 and 14 corresponds to a shutter speed such as 1 sec. With a slow shutter speed, the voltage step-up operation is not performed since variation in the shutter release timing is not problematic even when the voltage is cut from a low voltage state, as aforementioned.

Second Embodiment

A second embodiment of the present invention will be described next.

With the second embodiment, control is performed with consideration for the shutter time lag before the second curtain armature 7 and the second curtain yoke 8 depart when electricity to the second curtain coil 9 is turned off in the case of image sensing at a fast shutter speed during EVF execution. This control will be described in accordance with the flowchart of FIG. 8. Note that since the control during non-EVF image sensing is similar to the first embodiment, the same reference numerals are attached in the flowchart of FIG. 8, and related description will be omitted.

Image Sensing During EVF Execution

Next, controls on the mechanical shutter 12 and the electronic first curtain when performing hybrid shutter image sensing during EVF execution will be described with reference to FIGS. 2-5, 8, 9 and 15.

Figure 8:
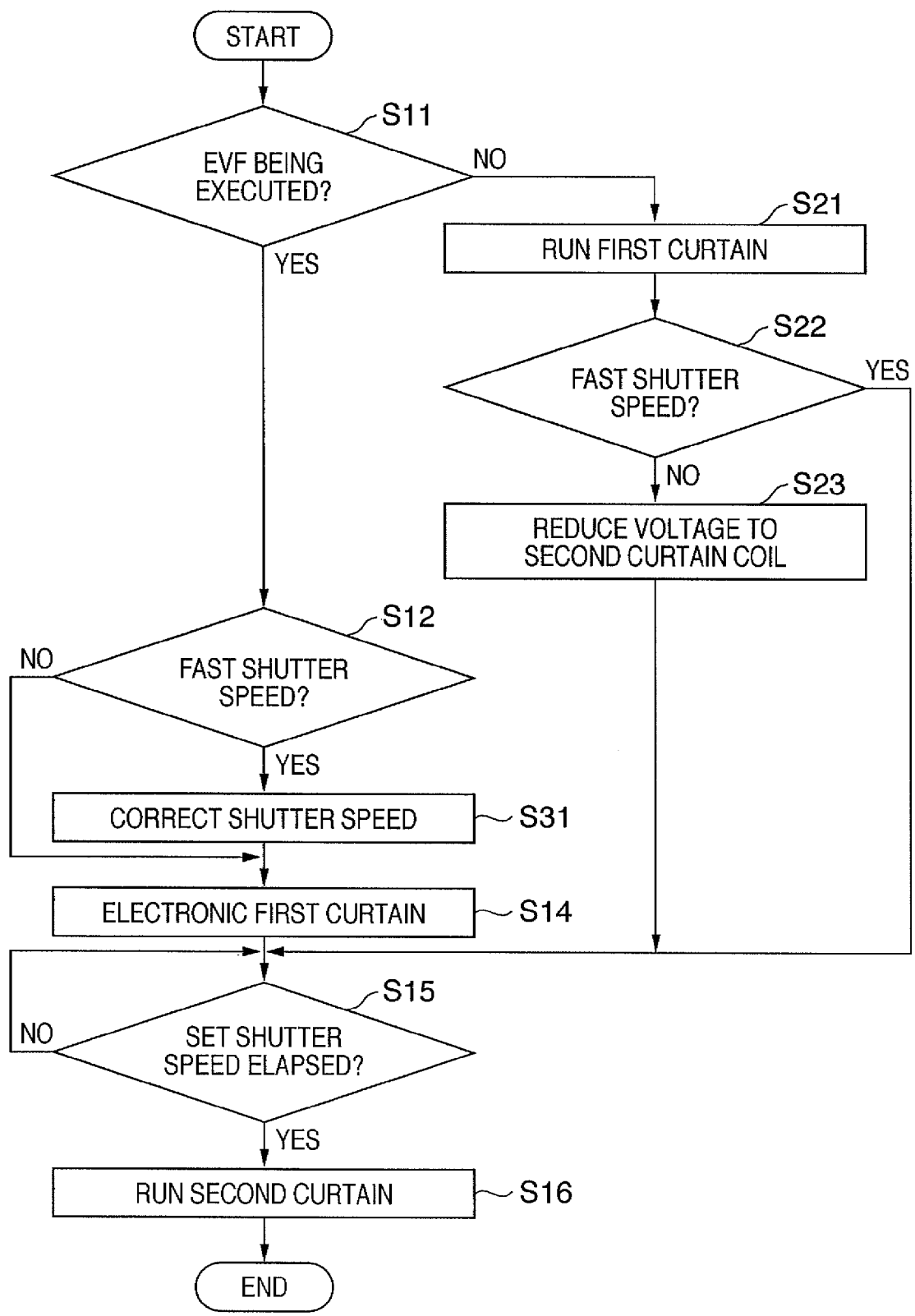
FIG. 8 is a flowchart illustrating a shutter control according to a second embodiment of the present invention.

When the shutter switch 62 is pressed, it is judged in step S11 of FIG. 8 whether the EVF function is being executed. Here, since the EVF function is being executed (YES in step S11), it is then judged in step S12 whether the set shutter speed is a fast shutter speed (e.g., 1/8000 sec).

Figure 9:
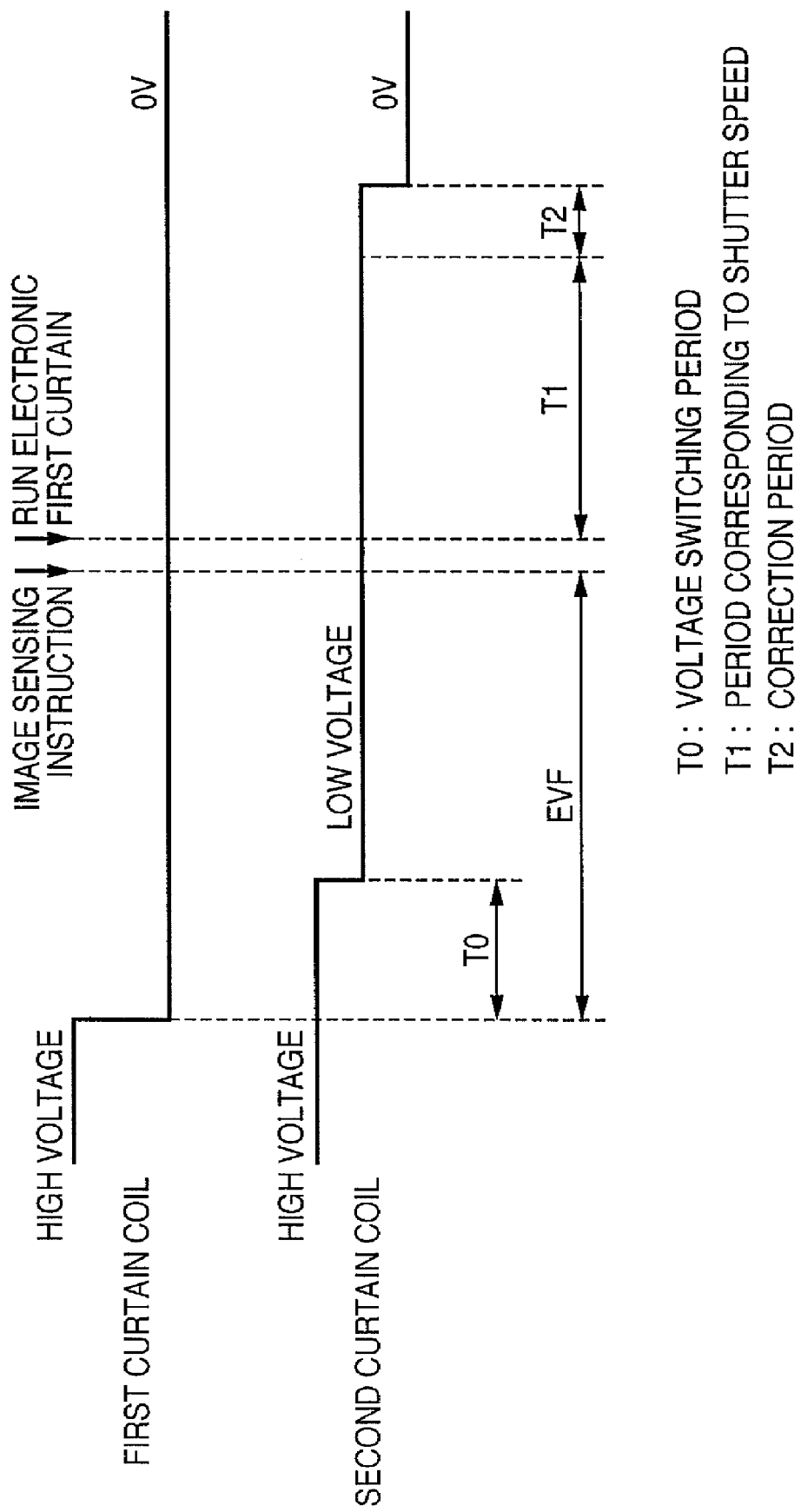
FIG. 9 is a time chart showing a fast shutter speed voltage control on the focal plane shutter during executing EVF according to the second embodiment of the present invention.

If the set shutter speed is a fast shutter speed (e.g., 1/8000 sec) (YES in step S12), as shown in FIG. 9, a correction time T2 is added to the time interval T1 corresponding to the shutter speed to give a new shutter speed (step S31). This correction time T2 is derived from the difference between the time lag (TH in FIG. 15) before the second curtain armature 7 and the second curtain yoke 8 depart when electricity to the second curtain coil 9 is turned off in a high voltage state and the time lag (TL in FIG. 15) when electricity to the second curtain coil 9 is turned off in a low voltage state.

Then, the pixels are reset using the electronic first curtain (step S14), and after the period (T1+T2) set in step S31 has elapsed (YES in step S15), the voltage is turned off (step S16).

The second blades 6a travel when electricity to the second curtain coil 9 is turned off, shifting to the state of FIG. 5 occluding the aperture 1a.

The charge operation described in the first embodiment is then performed, returning the mechanical shutter 12 to the charged state of FIG. 2.

Since the processing is similar to that described above in the first embodiment if, on the other hand, the set shutter speed is slow (e.g., 1 sec), related description will be omitted here.

The second curtain coil 9 becomes heated when the EVF function is executed continuously for a long time, increasing the resistance of the second curtain coil 9. Since current flowing to the second curtain coil 9 decreases when the resistance increases, the time lag before the second curtain armature 7 and the second curtain yoke 8 depart is further shortened. That is, when the period for which the EVF function is executed increases, the time lag before the second curtain armature 7 and the second curtain yoke 8 depart changes accordingly.

Figure 10:
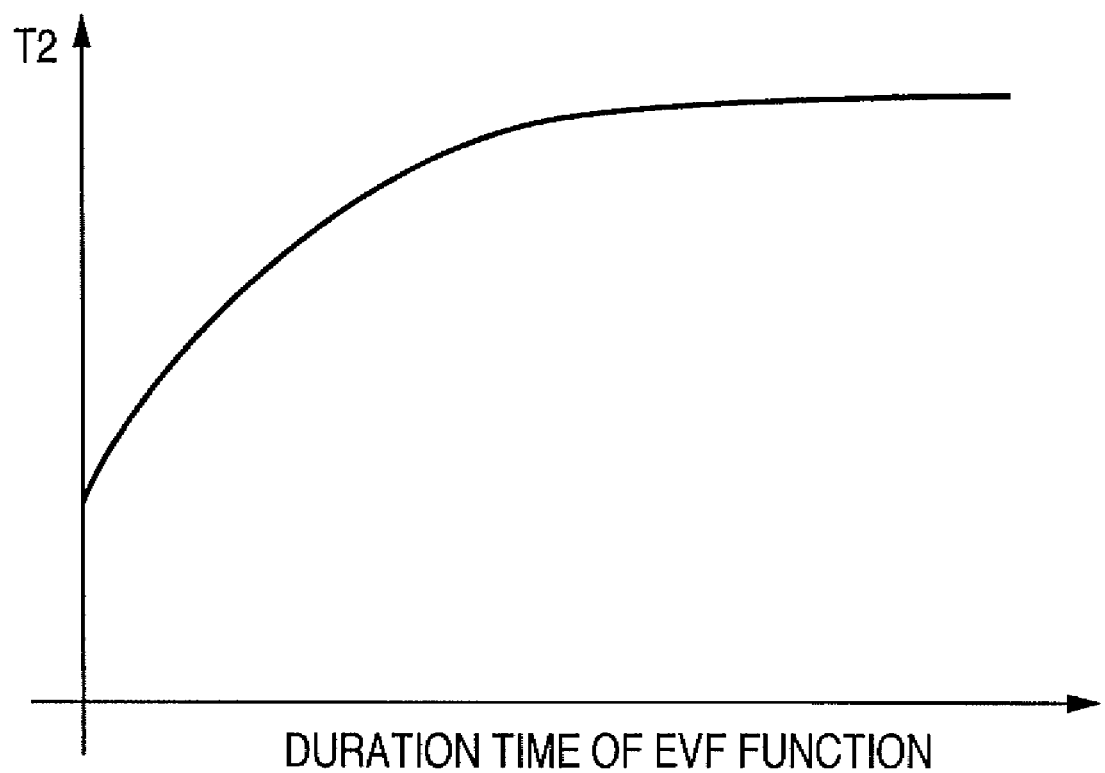
FIG. 10 is a graph showing the change in the correction period of the focal plane shutter with respect to the duration time of execution of an EVF according to the second embodiment of the present invention.
Figure 11:
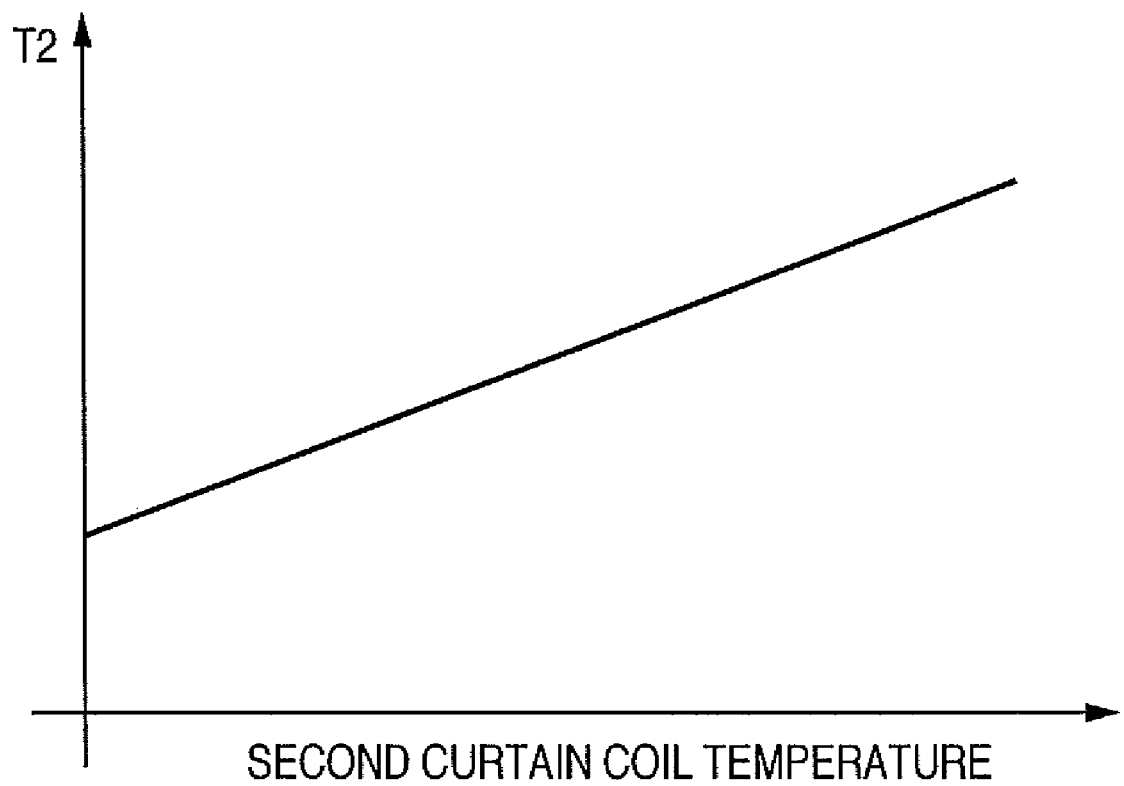
FIG. 11 is a graph showing the change in the correction period of the focal plane shutter with respect to second curtain coil temperature according to the second embodiment of the present invention.

In view of this, accuracy can be maintained by changing the correction period T2 according to the period for which the EVF function is continuously executed, as shown in FIG. 10. Alternatively, the correction period T2 may be changed according to the temperature of the second curtain coil 9 as shown in FIG. 11, using a second curtain coil temperature measuring unit (not shown).

As aforementioned, with high speed image sensing such as 1/8000 sec, the voltage control shown in FIG. 12 is performed in the case of non-EVF image sensing, and the voltage control shown in FIG. 9 is performed in the case of image sensing during EVF execution. Here, T1 in FIGS. 9 and 12 corresponds to a shutter speed such as 1/8000 sec, and a correction value is provided relative to the control period of non-EVF image sensing in the case of image sensing during EVF execution.

With slow speed image sensing such as 1 sec, the voltage control shown in FIG. 13 is performed in the case of non-EVF image sensing, and the time chart shown in FIG. 14 is used in the case of image sensing during EVF execution, with T1 corresponding to a slow shutter speed such as 1 sec. Thus, with slow speed image sensing, correction is not performed since there is no difference in the applied voltage between normal image sensing and image sensing during EVF execution.

Note that while the operations of a focal plane shutter with a first curtain have been described in the foregoing first and second embodiments, the present invention in not limited to this configuration. A focal plane shutter without a first curtain may also be used. In such a case, an electronic first curtain is used in place of the mechanical first curtain in non-EVF image sensing.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2006-344669, filed on Dec. 21, 2006, which is hereby incorporated by reference herein in its entirety.

What is claimed is:

1. An image sensing apparatus having an electronic viewfinder function, comprising:
   an image sensor that senses an image;
   a mechanical shutter including a second curtain held in a pre-travel initial position using electric power; and
   a shutter control unit that controls said mechanical shutter, wherein
   said shutter control unit holds the second curtain in the initial position in order to execute the electronic viewfinder function, reduces a voltage of the electric power for holding the second curtain during execution of the electronic viewfinder function, raises the voltage of the electric power for holding the second curtain if a shutter speed set for image sensing is faster than a preset period in a case where still image sensing is instructed during execution of the electronic viewfinder function, and controls said mechanical shutter when a period corresponding to the shutter speed has elapsed after resetting of said image sensor.

2. The image sensing apparatus according to claim 1, wherein said shutter control unit performs a control so as not to raise the voltage if the shutter speed is equal to or slower than the preset period.

3. The image sensing apparatus according to claim 1, wherein said shutter control unit controls said mechanical shutter when a period corresponding to the shutter speed has elapsed after resetting of said image sensor, without raising the voltage of the electric power for holding the second curtain, in a case where still image sensing is instructed without executing the electronic viewfinder function.

4. The image sensing apparatus according to claim 1, wherein said mechanical shutter is a focal plane shutter that causes the second curtain to travel by stopping supply of the electric power.

5. An image sensing apparatus having an electronic viewfinder function, comprising:
   an image sensor that senses an image;
   a mechanical shutter including a second curtain held in a pre-travel initial position using electric power; and
   a shutter control unit that controls said mechanical shutter, wherein
   said shutter control unit holds the second curtain in the initial position in order to execute the electronic viewfinder function, reduces a voltage of the electric power for holding the second curtain during execution of the electronic viewfinder function, corrects a shutter speed set for image sensing based on the reduced voltage if the shutter speed is faster than a preset period in a case where still image sensing is instructed during execution of the electronic viewfinder function, and controls said mechanical shutter so that the second curtain travels when a period corresponding to the corrected shutter speed has elapsed after resetting of said image sensor.

6. The image sensing apparatus according to claim 5, wherein
   a traveling time taken for the second curtain to travel after resetting of said image sensor changes depending upon the voltage of the electric power, and
   said shutter control unit corrects the shutter speed so as to compensate for a difference in the traveling time due to a difference in the voltage.

7. The image sensing apparatus according to claim 5, wherein
   a traveling time taken for the second curtain to travel after resetting of said image sensor changes depending upon an execution duration of the electronic viewfinder function, and
   said shutter control unit corrects the shutter speed so as to compensate for a difference in the traveling time due to a difference in the execution duration of the electronic viewfinder function.

8. The image sensing apparatus according to claim 5, wherein
   a traveling time taken for the second curtain to travel after resetting of said image sensor changes depending upon a temperature of circuitry that holds the second curtain in the initial position, and
   said shutter control unit corrects the shutter speed so as to compensate for a difference in the traveling time due to a difference in the temperature.

9. The image sensing apparatus according to claim 5, wherein
   the shutter speed is not corrected if the shutter speed is equal to or slower than the preset period, and
   said shutter control unit controls said mechanical shutter so that the second curtain travels when a period corresponding to the shutter speed that has not been corrected has elapsed after resetting of said image sensor.

10. The image sensing apparatus according to claim 5, wherein said shutter control unit controls said mechanical shutter so that the second curtain travels when the period corresponding to the corrected shutter speed has elapsed after resetting of said image sensor, without correcting the shutter speed based on the reduced voltage in a case where still image sensing is instructed without executing the electronic viewfinder function.

11. The image sensing apparatus according to claim 5, wherein said mechanical shutter is a focal plane shutter that causes the second curtain to travel by stopping supply of the electric power.

* * * * *